(12) United States Patent
Taoda

(10) Patent No.: US 11,310,380 B2
(45) Date of Patent: Apr. 19, 2022

(54) READING OF SETTING INFORMATION FROM EXTERNAL MEDIUM AND DISPLAY OF SETTING SCREENS IN IMAGE PROCESSING APPARATUS, METHOD, AND SYSTEM

(71) Applicant: TOSHIBA TEC KABUSHIKI KAISHA, Tokyo (JP)

(72) Inventor: Masami Taoda, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/097,309

(22) Filed: Nov. 13, 2020

(65) Prior Publication Data

US 2021/0258437 A1    Aug. 19, 2021

(30) Foreign Application Priority Data

Feb. 14, 2020    (JP) .............................. JP2020-023658

(51) Int. Cl.
*H04N 1/00* (2006.01)

(52) U.S. Cl.
CPC ..... *H04N 1/00482* (2013.01); *H04N 1/00424* (2013.01); *H04N 1/00432* (2013.01); *H04N 1/00474* (2013.01)

(58) Field of Classification Search
None
See application file for complete search history.

(56) References Cited

U.S. PATENT DOCUMENTS

| | | | |
|---|---|---|---|
| 5,077,581 A | 12/1991 | Suzuki | |
| 5,260,742 A | 11/1993 | Kikkawa | |
| 7,327,478 B2 * | 2/2008 | Matsuda | H04N 1/00204 358/1.13 |
| 2004/0109194 A1 | 6/2004 | Yano | |
| 2007/0182982 A1 * | 8/2007 | Hayashida | H04N 1/0035 358/1.14 |
| 2007/0211264 A1 * | 9/2007 | Hoshino | H04N 1/00482 358/1.1 |

(Continued)

FOREIGN PATENT DOCUMENTS

| | | |
|---|---|---|
| EP | 0301459 A2 | 2/1989 |
| GB | 2313925 A | 12/1997 |
| JP | 2004-330708 A | 11/2004 |

OTHER PUBLICATIONS

Extended European Search Report dated Apr. 28, 2021, mailed in counterpart European Patent Application No. 20215622.0, 8 pages.

*Primary Examiner* — Henok Shiferaw
(74) *Attorney, Agent, or Firm* — Kim & Stewart LLP

(57) ABSTRACT

An image processing apparatus includes an image reader, an input operation unit including a display, an interface configured to receive, from an external medium, setting information for processing of an image read by the image reader, and a controller. The controller is configured to control the display to display a first setting screen for processing the image when the setting information is not received from the external medium and to control the display to display a second setting screen for processing the image when the setting information is received from the external medium. The second setting screen indicates that an operational setting designated by the setting information has already been set on the image processing apparatus.

20 Claims, 9 Drawing Sheets

(56) References Cited

U.S. PATENT DOCUMENTS

| | | | |
|---|---|---|---|
| 2008/0304849 A1* | 12/2008 | Harigae | G03G 15/5016 |
| | | | 399/83 |
| 2009/0231353 A1* | 9/2009 | Han | H04N 1/00222 |
| | | | 345/581 |
| 2015/0373215 A1* | 12/2015 | Hayashi | H04N 1/4406 |
| | | | 358/1.14 |
| 2015/0381839 A1* | 12/2015 | Adachi | H04N 1/00225 |
| | | | 358/474 |
| 2016/0269576 A1* | 9/2016 | Norota | G06F 3/1292 |
| 2020/0195791 A1* | 6/2020 | Takahashi | H04N 1/0097 |
| 2020/0195810 A1* | 6/2020 | Natori | G06F 3/1292 |
| 2021/0006685 A1* | 1/2021 | Fukuda | G06F 3/1204 |

\* cited by examiner

FIG. 6B

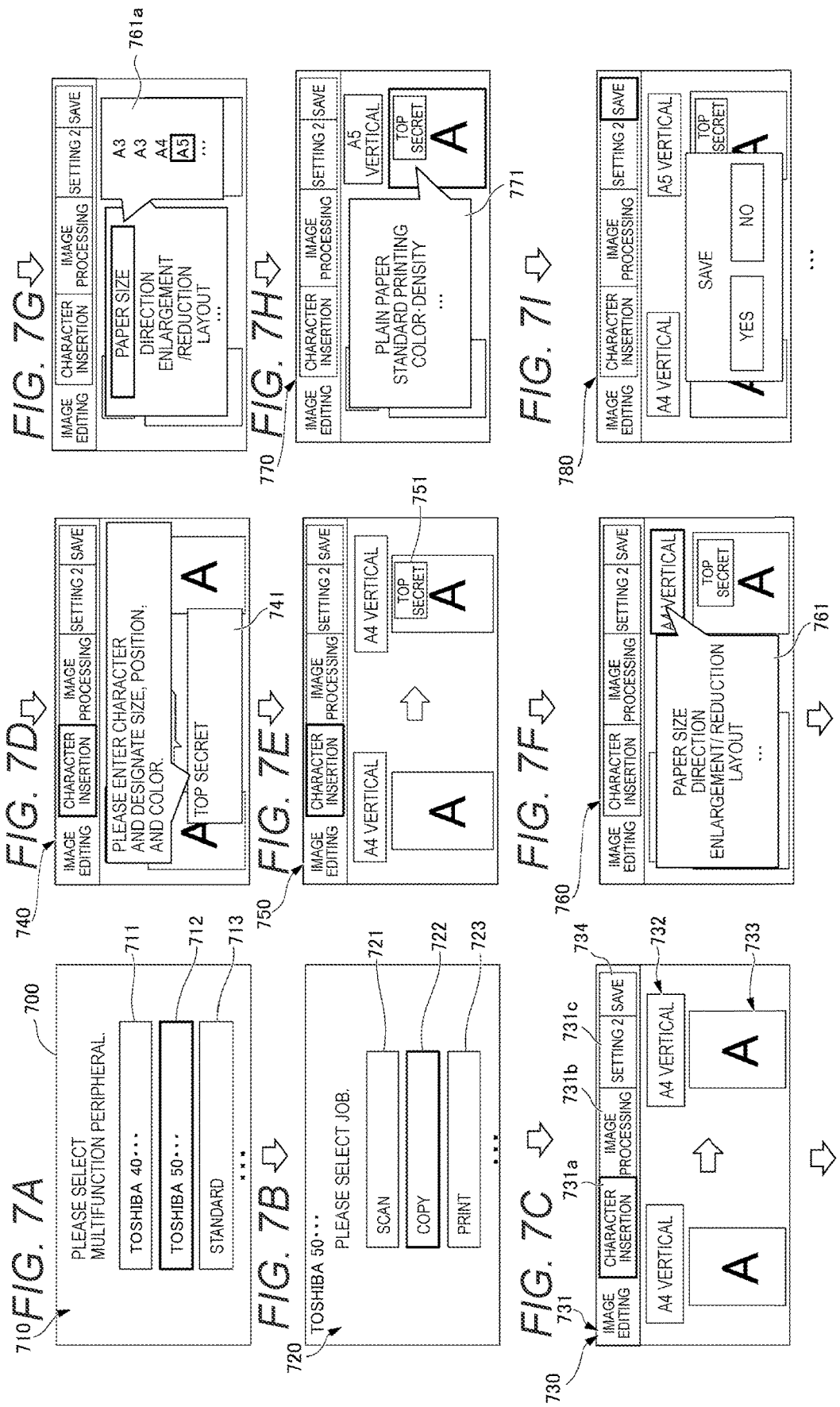

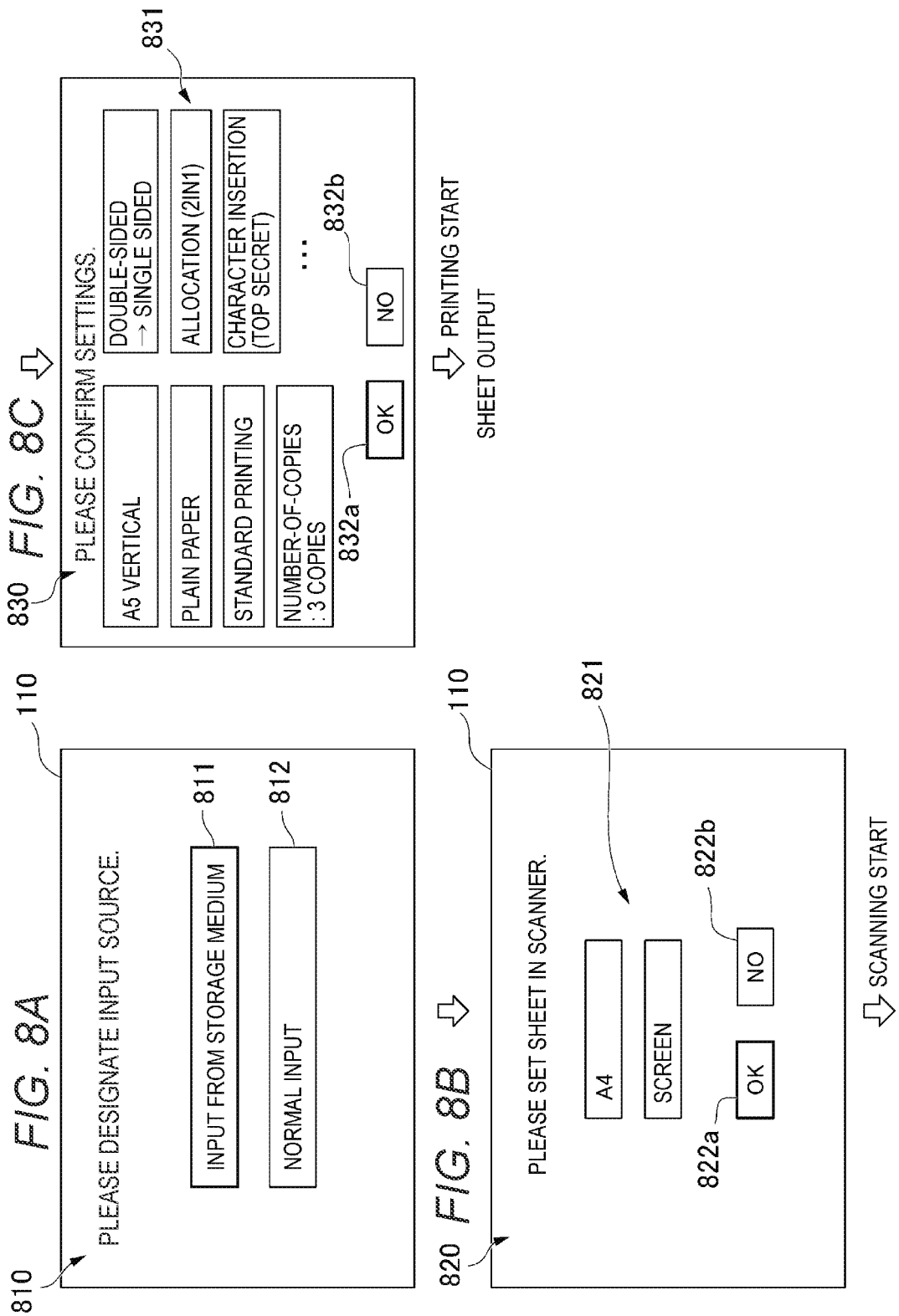

READING OF SETTING INFORMATION FROM EXTERNAL MEDIUM AND DISPLAY OF SETTING SCREENS IN IMAGE PROCESSING APPARATUS, METHOD, AND SYSTEM

CROSS-REFERENCE TO RELATED APPLICATION

This application is based upon and claims the benefit of priority from Japanese Patent Application No. 2020-023658, filed on Feb. 14, 2020, the entire contents of which are incorporated herein by reference.

FIELD

Embodiments described herein relate generally to an image forming apparatus, an image forming method, and an image forming system.

BACKGROUND

Conventionally, an image forming apparatus (such as a multifunction peripheral) can be installed in a store such as a convenience store or a supermarket. The image forming apparatus receives a user operation for the changing or setting of various parameters or functional settings via an operation panel and performs printing accordingly. In some instances, printing may involve complicated image processing. When performing printing involving complicated image processing, a user may be required to perform various settings via the operation panel (such as a touch panel or the like).

As a related technique, there is an image forming apparatus that reads user identification information from a storage medium and sets a function(s) according to the identification information. For example, based on the identification information the image forming apparatus may be set to perform a copying operation or the like based on pre-stored or preset user preferences with respect copying (or other function) parameters.

However, such a conventional technique may still require a complicated user operation on the image forming apparatus when performing printing involving the complicated image processing.

Embodiments are directed to enabling setting of the image forming apparatus with simpler operations thereon.

BRIEF DESCRIPTION OF THE DRAWINGS

FIG. 6B illustrates another example of screens according to the normal operation procedure, which are displayed on the display of the image forming apparatus.

FIGS. 7A-7I illustrate an example of a setting input screen displayed on a display of a personal computer.

FIGS. 8A-8C illustrate an example of screens according to a simple operation procedure displayed on the image forming apparatus when operation information is input from a storage medium.

DETAILED DESCRIPTION

Figure 1:
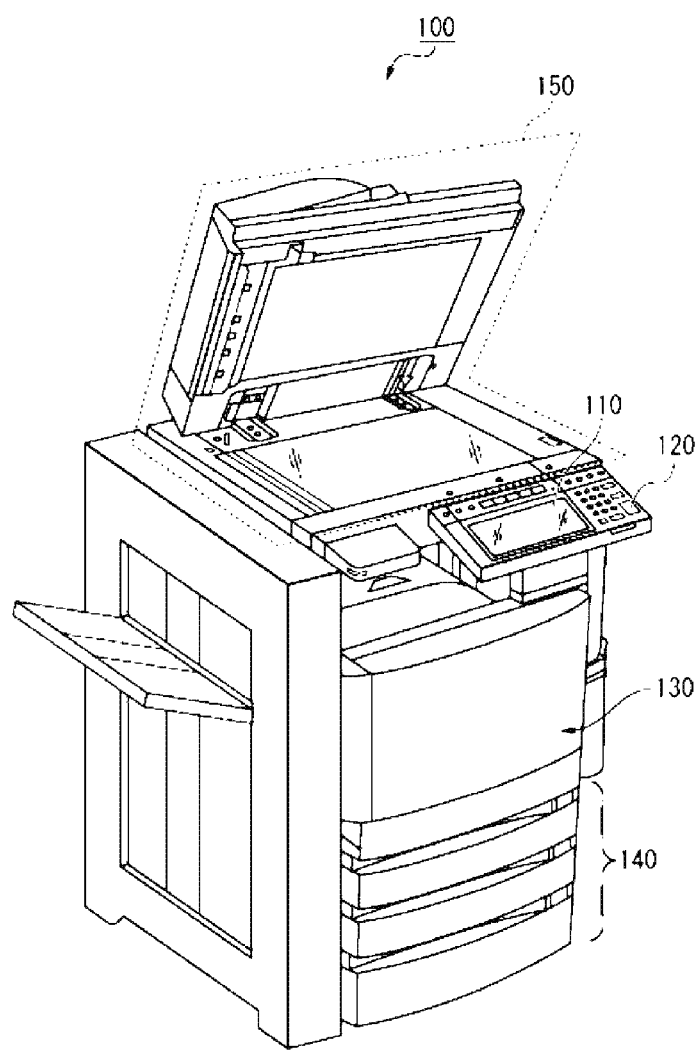
FIG. 1 illustrates an example of an overall configuration of an image forming apparatus according to an embodiment.

In general, according to an embodiment, an image processing apparatus includes an image reader, an operation unit including a display, an interface configured to receive, from an external medium, setting information for processing of an image read by the image reader, and a controller. The controller is configured to control the display to display a first setting screen for processing the image if the setting information is not received from the external medium and to control the display to display a second setting screen for processing the image if the setting information is received from the external medium. The second setting screen indicates that an operational setting corresponding to the setting information from the external medium has been set on the image processing apparatus.

Hereinafter, certain example embodiments of an image processing apparatus, a program, and an image forming system will be described with reference to the accompanying drawings. In the following description, configurations having the same or similar functions are denoted by the same reference numerals. Description of duplicated configurations may be omitted.

First, the overall configuration of an image forming apparatus 100 will be described with reference to FIG. 1. FIG. 1 illustrates an example of an overall configuration of the image forming apparatus 100 according to an embodiment. The image forming apparatus 100 is, for example, a multifunction peripheral (MFP) having functions of a copying machine, a printer, and a facsimile. The image forming apparatus 100 may be provided in, for example, a convenience store or a supermarket. The image forming apparatus 100 includes a display 110, a control panel 120, a printer 130, a sheet storage unit 140, and an image reading unit 150. The image forming apparatus described herein is an example of an image processing apparatus.

The display 110 is, for example, a liquid crystal display (LCD) with a touch panel attached. The display 110 displays various types of information. The display 110 displays various types of information based on an instruction from a control unit 200 (see FIG. 2). The display 110 receives an operation from a user. The display 110 outputs operation signals according to various input operations performed by the user to the control unit 200.

The control panel 120 includes various operation keys such as numeric keys pad and a start key. The control panel 120 receives various input operations of the user. The control panel 120 also outputs operation signals according to various input operations performed by the user to the control unit 200.

The printer 130 performs a series of printing operations using various types of information output from the display 110, the control panel 120, the image reading unit 150, and the like. The series of printing operations includes an operation of receiving image information, an operation of forming an image, an operation of transferring the formed image to a sheet, an operation of conveying the sheet, and the like.

The sheet storage unit 140 includes a plurality of sheet cassettes. Each sheet cassette stores sheets. Each sheet cassette stores different types (for example, different size) of sheets.

The image reading unit 150 includes an automatic document feeder and a scanner device. The automatic document feeder feeds a document placed on a document tray to the scanner device. The scanner device optically scans a document on a document glass table and forms an image of reflected light from the document on a light receiving surface of a charge coupled device (CCD) sensor. With this configuration, the scanner device reads a document image on the document glass table. The image reading unit 150 generates image information (image data) using the reading result read by the scanner device. The image reading unit 150 may be referred to as an image reader.

Figure 2:
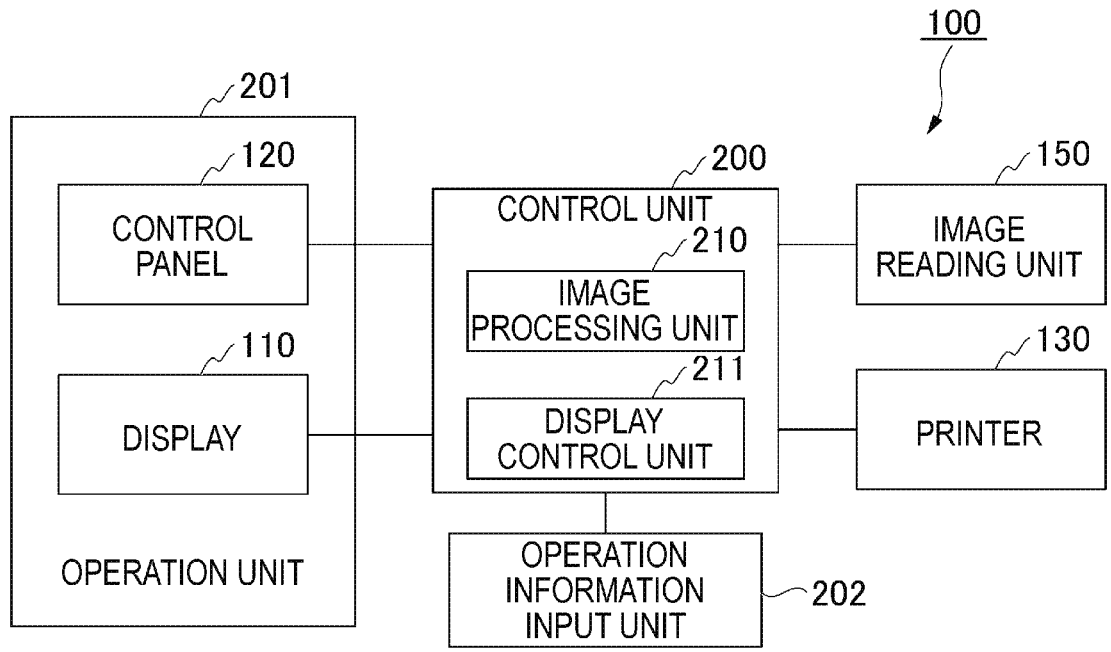
FIG. 2 is a block diagram illustrating an example of a functional configuration of the image forming apparatus.

Next, a functional configuration of the image forming apparatus 100 will be described with reference to FIG. 2. FIG. 2 is a block diagram illustrating an example of the functional configuration of the image forming apparatus 100. As illustrated in FIG. 2, the image forming apparatus 100 includes the printer 130, the image reading unit 150, the control unit 200, an operation unit 201, and an operation information input unit 202. The control unit 200 includes an image processing unit 210 and a display control unit 211.

The image reading unit 150 reads an image. The operation unit 201 receives an operation of the user. The operation unit 201 includes the display 110 and the control panel 120. In the following, the original when copying the sheet may be referred to as a "document sheet" and the copy may be referred to as a "sheet to be copied".

The operation information input unit 202 receives operation information about an operation procedure generated by another device. The other device is, for example, a personal computer 300 (see FIG. 3). The operation information about the operation procedure may be information (operation procedure itself) indicating the operation procedure. The information indicating the operation procedure is information for displaying the contents set by the personal computer 300, information for performing a display for receiving a confirmation operation from the user, and the like. The operation information input unit 202 may be referred to as an interface. The operation information may be referred to as setting information, such as setting information indicating operation setting in image processing by the image forming apparatus 100.

The contents set by the personal computer 300 are, for example, settings relating to input of image information and settings relating to image formation by the image forming apparatus 100. For example, the settings relating to the input of image information are settings such as a sheet size of the document and a document format description (e.g., single-sided or double-sided). The settings relating to image formation include, for example, a setting for magnification (enlargement and reduction) and a setting for color format (color and black and white).

These various settings may also include a special setting. In this context, a special setting can be a setting by which, if implemented on the image forming apparatus 100, the number of available operating procedures increases and the operation becomes complicated. Specifically, in this context, the special setting is a setting for which it is considered difficult to perform using just operation input via the display 110 or the control panel 120. More specifically, the special setting can be related to, for example, copying an image of a document printed on both sides of an A4 sheet by laying out the image on one side of an A5 sheet, copying an image by mixing double-sided printing and single-sided printing, or the like. The special setting may be a setting that cannot be made via the display 110 or the control panel 120. That is, the special setting may be one that can only be input from the personal computer 300.

The operation information about the operation procedure may be information from which the image forming apparatus 100 can generate information indicating the operation procedure. Such information may be generated by the personal computer 300. That is, the image forming apparatus 100 may generate the operation procedure by analyzing the information generated by the personal computer 300.

The image processing unit 210 performs processing using the image read by the image reading unit 150. The processing mentioned here may include at least one of image reading processing for obtaining image data, image forming processing for forming an image, transfer processing for transferring the formed image to a sheet, and sheet conveyance processing for conveying the sheet.

The display control unit 211 displays different screens depending on whether the operation information is received by the operation information input unit 202 or is not received by the operation information input unit 202. Specifically, when operation information is not received by the operation information input unit 202, the display control unit 211 displays one or more screens corresponding to the normal operation procedure. The screen corresponding to the normal operation procedure is a normal setting screen for receiving operations of various settings.

On the other hand, when the operation information is received by the operation information input unit 202, the display control unit 211 displays one or more screens corresponding to an operation procedure (hereinafter, may be referred to as "simple operation procedure") based on the received operation information. The screen corresponding to the simple operation procedure is easier for the user to grasp the setting than the normal setting screen. The screen corresponding to the simple operation procedure is a screen that requires only a simplified operation as compared with the screen corresponding to the normal operation procedure.

Specifically, the screen corresponding to the simple operation procedure is, for example, a screen that requires a smaller number of user operations than that required by the screens corresponding to the normal operation procedure. More specifically, the screen corresponding to the simple operation procedure simply displays the settings set in the personal computer 300 and is configured to only receives a confirmation operation (for example, an OK button).

The operation information may be different depending on a model of the image forming apparatus 100. For example, the special setting can be set on a certain model but not on another model. When a setting designated by the operation information is not available in the image forming apparatus 100, that is, when the setting cannot be made on the image forming apparatus 100, the image forming apparatus 100 may notify that fact. When the setting designated by the operation information is not available, the image forming apparatus 100 may display an available function similar to the special setting and accept a user's consent.

Next, an operation information input format in the operation procedure will be described. In the present embodiment, the operation information is stored in a storage medium 304 (see FIG. 3). The storage medium 304 stores the operation information generated by the personal computer 300. The user visits the store with the storage medium 304.

The operation information input unit 202 receives the operation information stored in the storage medium 304.

When the storage medium 304 is connected to the image forming apparatus 100, the operation information input unit 202 receives the operation information stored in the storage medium 304. The storage medium 304 is a disk, a semiconductor memory, a universal serial bus (USB) memory, or the like. That is, the operation information input unit 202 may include a connector connectable to the storage medium 304.

The operation information may be coded (for example, two-dimensional coded) and displayed on a sheet, a smartphone, or the like. In this case, the image reading unit 150 or a code reader included in the image forming apparatus 100, serving as the operation information input unit 202, may receive the operation information by reading the code.

The storage medium 304 may also be a wireless tag. In this case, a wireless tag reader (not illustrated) included in the image forming apparatus 100 as the operation information input unit 202 may read the operation information from the wireless tag.

The control unit 200 may be configured with a central processing unit (CPU) included in the image forming apparatus 100. That is, the function of the control unit 200 may be achieved by the CPU executing a program stored in a memory such as a read only memory (ROM) or a random access memory (RAM). The CPU executes a program to perform various kinds of processing, but is not limited thereto. For example, it is possible to perform various kinds of processing by using hardware (circuitry) such as a large scale integration (LSI), application specific integrated circuit (ASIC), field-programmable gate array (FPGA), graphics processing unit (GPU), and the like, and it is also possible to perform various kinds of processing by cooperation of software and hardware. The control unit 200 may be referred to as a controller.

The program may be stored in advance in a storage device (storage device including a non-transitory storage medium) such as a hard disk drive (HDD) or a flash memory. The program may be stored in a removable storage medium 304 (non-transitory storage medium), such as a DVD or a CD-ROM, and may be installed by mounting the storage medium 304 on a storage medium I/F 303.

Figure 3:
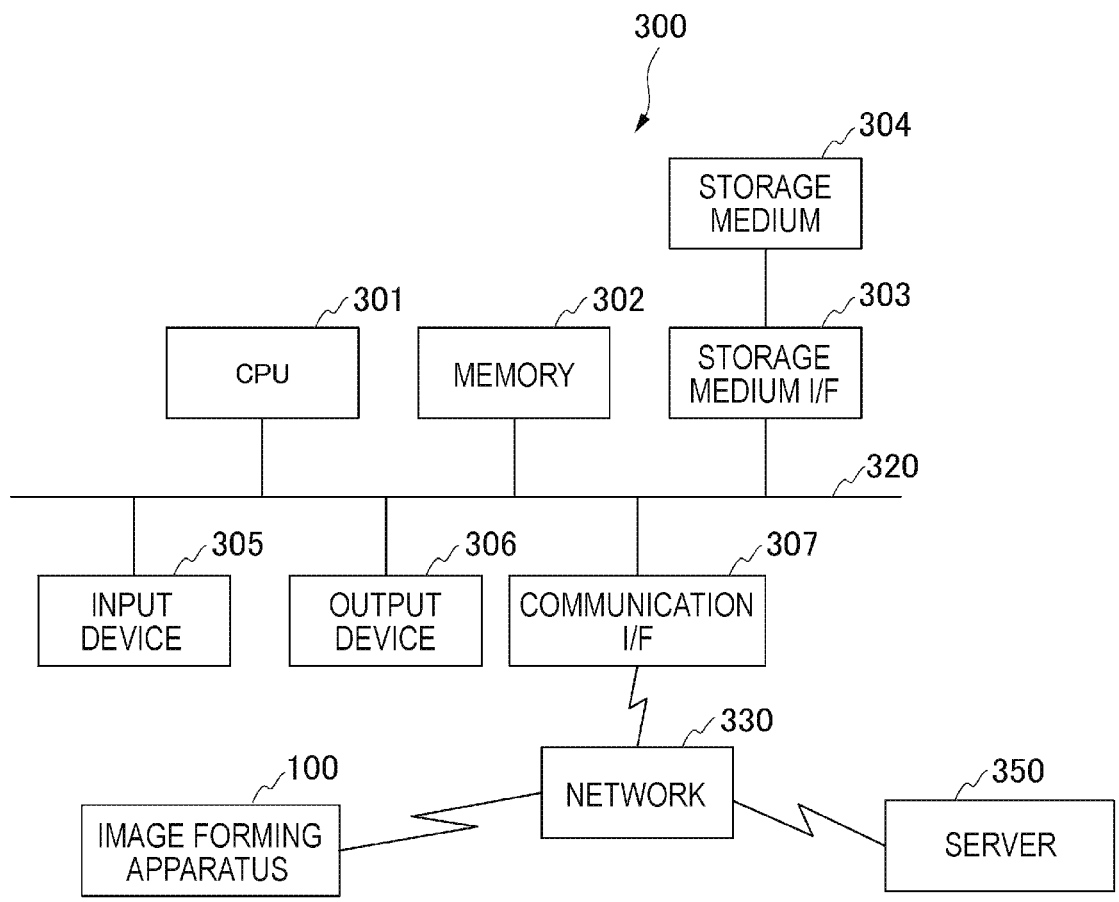
FIG. 3 illustrates an example of a hardware configuration of a personal computer.

Next, a configuration of the personal computer 300 will be described with reference to FIG. 3. FIG. 3 illustrates an example of a hardware configuration of the personal computer 300. The personal computer 300 is an example of an information processing device (another device). The personal computer 300 is, for example, a desktop personal computer 300 installed in a user's home. However, the information processing device is not limited to the desktop personal computer 300 and may be a portable computer device such as a smartphone, a tablet device, or a notebook computer.

In FIG. 3, the personal computer 300 includes a CPU 301, a memory 302, the storage medium interface (I/F) 303, the storage medium 304, an input device 305, an output device 306, and a communication I/F 307. The respective units 301 to 307 included in the personal computer 300 are connected to each other by a bus 320.

The CPU 301 controls the entire personal computer 300. The memory 302 includes, for example, a ROM, a RAM, a flash ROM, and the like. Specifically, for example, the flash ROM or the ROM stores various programs such as an operation information input program. The RAM is used as a work area for the CPU 301. The program stored in the memory 302 is loaded into the CPU 301 to cause the CPU 301 to execute coded processing.

In the present embodiment, the CPU 301 executes various programs to perform various kinds of processing, but the present disclosure is not limited thereto. For example, various kinds of processing may instead be performed by using hardware such as an LSI, an ASIC, a FPGA, a GPU, or the like, and it is also possible to perform various kinds of processing by cooperation and combinations of software and hardware.

The program may be stored in advance in a storage device or other a non-transitory storage medium such as an HDD or a flash memory. The program may be stored in a removable storage medium 304 such as a DVD or a CDROM, and may be installed by mounting the storage medium 304 on the storage medium I/F.

The storage medium I/F 303 controls reading and writing of data for the storage medium 304 according to control of the CPU 301. The storage medium I/F 303 is, for example, a disk drive, a solid state drive (SSD), a USB port, or the like. The storage medium 304 is a non-volatile memory that stores data written under the control of the storage medium I/F 303. Specifically, the storage medium 14 is, for example, a disk, a semiconductor memory, a USB memory, or the like. The storage medium 304 is removable from the personal computer 300. The storage medium 304 may be referred to as an external medium.

The input device 305 operates to input data such as characters, numbers, and various instructions. The input device 305 is, for example, a keyboard or a mouse. The input device 305 may also include an image reading device, a control panel, and a touch panel. The image reading device has an imaging function such as a camera and a scanner function for reading a two-dimensional code. The input device 54 may include a microphone for inputting voice and a touch panel for inputting characters, numbers, various instructions, and the like by a user's operation.

The output device 306 includes, for example, a display 700 (see FIGS. 7A-7I) that displays an image, a speaker that outputs sound, a printer device, and the like.

The communication I/F 307 is connected to a network 330 via a communication line and to a server 350 or the image forming apparatus 100 via the network 330. The communication I/F 307 manages the network 330 and an internal interface and controls the input and output of data to and from another device. For the communication I/F 307, for example, a modem or LAN adapter can be adopted. The network 330 is, for example, a local area network (LAN), a wide area network (WAN), the Internet, or the like.

Next, functions performed by the personal computer 300 will be described. The personal computer 300 includes a reception unit, a generation unit, and an output unit. The reception unit receives an input of the setting contents of the image forming apparatus 100 from the user. The reception unit may be configured with the input device 305 such as a mouse and a keyboard. The image processing may include at least one of image reading processing, image forming processing, transfer processing, and sheet conveyance processing described above. The setting contents include a setting relating to input of image information, a setting relating to image formation, and the special setting described above.

The special setting includes, for example, a setting such as adding characters such as "top secret" to a sheet to be copied or changing a character color or a background color of the sheet to be copied. The special setting also includes setting different settings for each document or each sheet to be copied. For example, a first setting may be a setting of an image of the document printed on both sides of the A4 sheet to be copied on one side of the A5 sheet. A second setting may be a setting of an image of the document printed on one side of the A5 sheet to be copied on both sides of the A4 sheet. In this case, the reception unit may receive the input of respective contents for each setting. A different file name can be given to each setting to be saved.

The reception unit receives the input of the setting contents in a display format different from the display format of the screen displayed on the display 110 of the image forming apparatus 100. Here, since the reception unit is configured with the input device 305 such as a mouse and a keyboard, unlike the operation (mainly depressing) on the display 110 of the image forming apparatus 100, the special setting can be easily performed. Specifically, since a mouse or a keyboard is used, it is possible to easily perform special processing and settings such as inserting characters in the sheet to be copied and changing the character color and background color of the sheet to be copied.

The setting contents (function) of the image forming apparatus 100 are different depending on the model. For that reason, the personal computer 300 may not store the setting contents of each model. In this case, the personal computer 300 may inquire of the server 350 about the setting contents according to the model and receive the setting contents according to the model. The server 350 manages the setting contents for each model.

When the personal computer has a function specific to the image forming apparatus 100 targeted for setting, the personal computer may display that effect. With this configuration, it is possible to perform a special setting according to the specific function.

The reception unit may receive the input of the setting contents from a screen which is the same as or similar to the screen displayed on the display 110 of the image forming apparatus 100. Even with such a screen, when the personal computer 300 receives the input of the setting contents, the user can input the setting contents more easily than when the operation is received from the display 110 of the image forming apparatus 100. Since the user can input the setting contents at a place other than the store, the user can input the setting contents without applying mental pressure due to occupying the image forming apparatus 100.

The generation unit generates operation information about the operation procedure based on the setting contents received by the reception unit. The operation information generated by the generation unit may be information indicating the operation procedure (operation procedure itself) or information by which the image forming apparatus 100 can generate an operation procedure. The generation unit is configured with the CPU 301, for example. That is, the function of the generation unit may be achieved by the CPU executing the program stored in the memory such as the ROM or the RAM.

The output unit outputs the operation information generated by the generation unit. The output unit outputs the operation information to the storage medium 304. The output unit may be configured with the storage medium I/F 303. The output unit may display the two-dimensional code in which the operation information is coded on the sheet or the smartphone. The output unit may output (transmit) the operation information to the server 350 with the image forming apparatus 100 as a destination. In this case, the image forming apparatus 100 (more particularly, operation information input unit 202) may receive the operation information generated by the personal computer 300 from the server 350. However, in this case, the operation information is associated with identification information of the user. Then, the image forming apparatus 100 may read the identification information associated with the identification information by receiving the identification information from the user at the start of copying.

The image forming apparatus 100 displays a plurality of models and receives designation of the model from the user before receiving the input of the setting contents from the user. The model to be displayed may be a model installed in a store around the position where the personal computer 300 is disposed. For example, the personal computer 300 may inquire of the server 350 about the model of the image forming apparatus 100 installed in a surrounding store location and receive the setting contents according to the model from the server 350. For example, when the information processing device is a portable computer device, the personal computer 300 may inquire of the server 350 about the model of the image forming apparatus 100 installed in the surrounding store together with position information of the computer device, and receive the setting contents according to the model around the computer device from the server 350.

Figure 4:
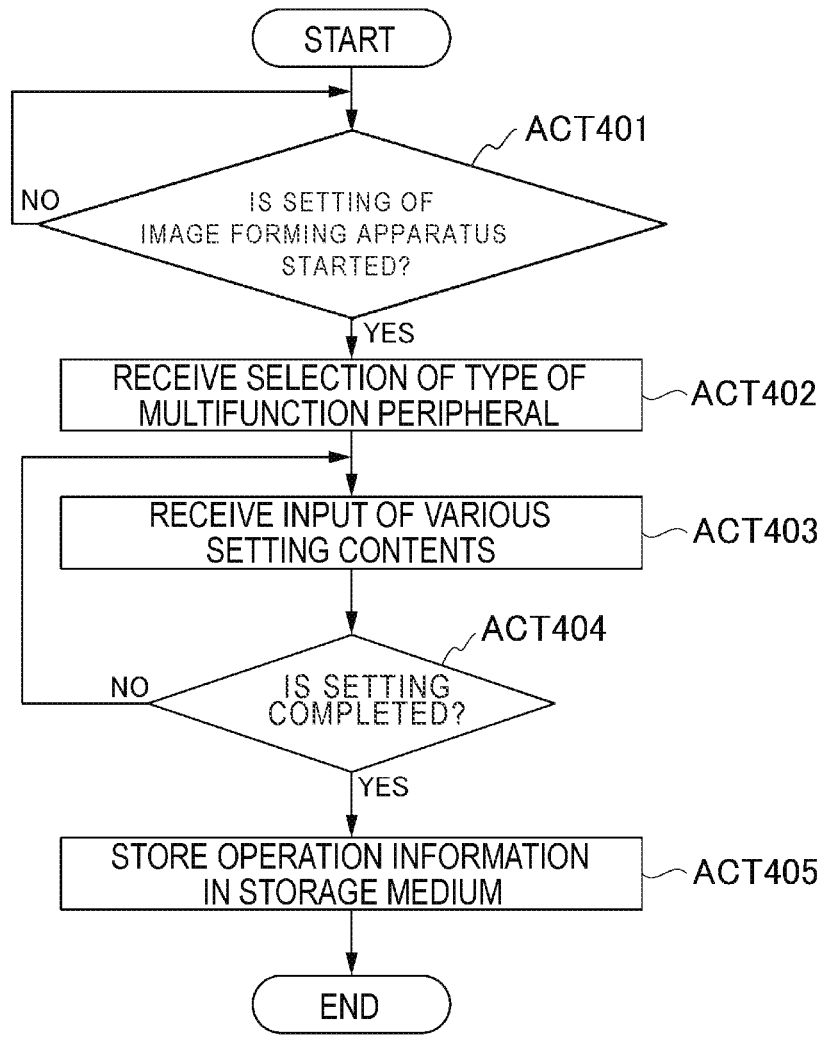
FIG. 4 is a flowchart of an operation information input process performed by the personal computer.

Next, an example of an operation information input process performed by the personal computer 300 will be described with reference to FIG. 4. FIG. 4 is a flowchart illustrating an example of the operation information input process performed by the personal computer 300. As illustrated in FIG. 4, the personal computer 300 determines whether or not setting of the image forming apparatus 100 is started by activating input setting software (ACT 401). The personal computer 300 waits until the input setting of the image forming apparatus 100 starts (NO in ACT 401). When the input setting of the image forming apparatus 100 starts (YES in ACT 401), the personal computer 300 receives selection of a type of the multifunction peripheral (image forming apparatus 100) (ACT 402).

Then, the personal computer 300 receives the input of various setting contents (ACT 403). Next, the personal computer 300 determines whether or not the setting of various setting contents has been completed (ACT 404). When the setting of various setting contents is not completed (NO in ACT 404), the process goes back to ACT 403. When the input of various setting contents is completed (YES in ACT 404), the personal computer 300 stores the operation information in the storage medium 304 (ACT 405) and ends this series of processing functions.

Figure 5:
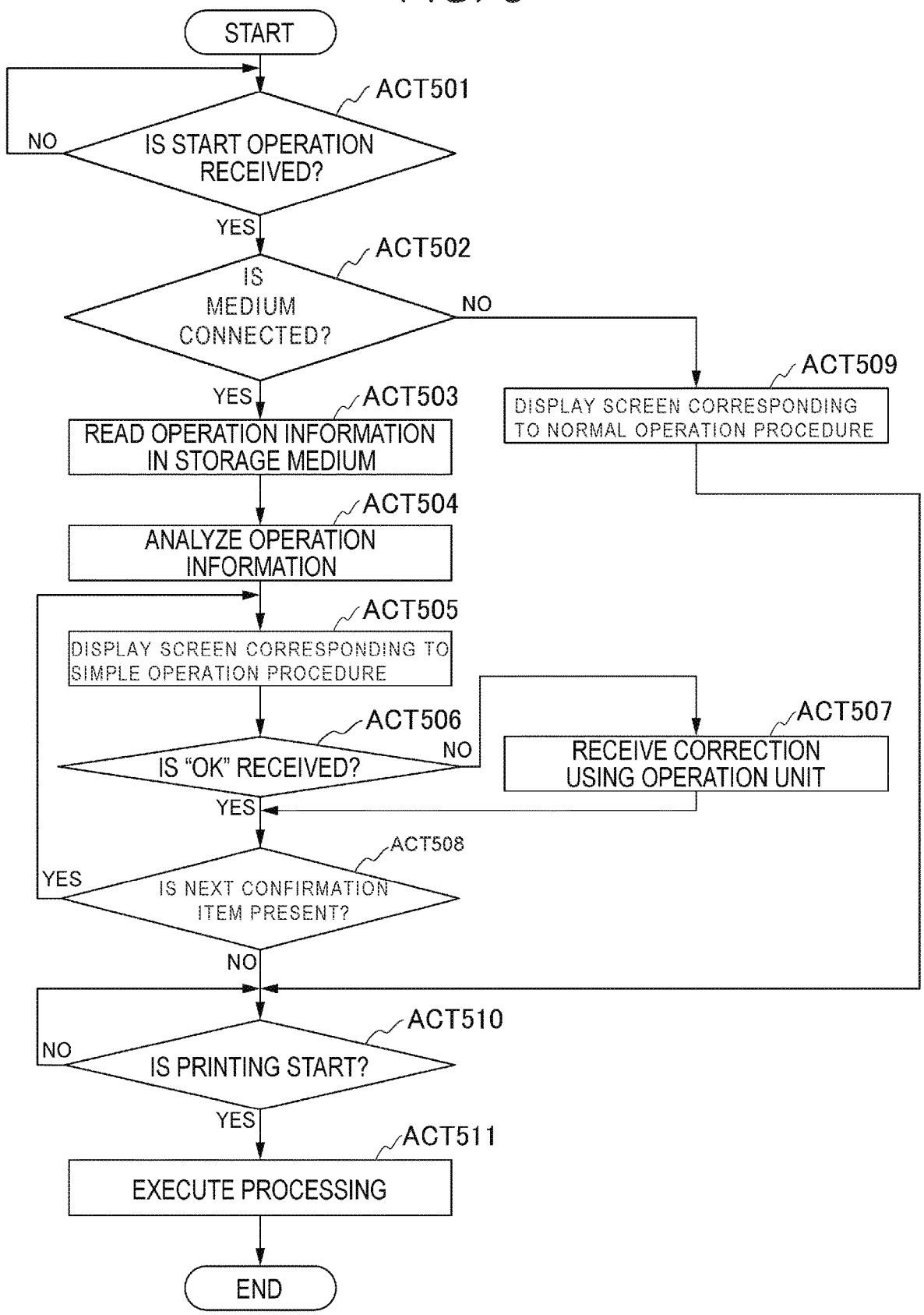
FIG. 5 is a flowchart of an image forming process performed by the image forming apparatus.

Next, an example of an image forming process performed by the image forming apparatus 100 will be described with reference to FIG. 5. FIG. 5 is a flowchart illustrating an example of the image forming process performed by the image forming apparatus 100. As illustrated in FIG. 5, the personal computer 300 determines whether or not a start operation of image processing (for example, copying) is received (ACT 501). The operation of starting the image processing is, for example, operating the touch panel of the display 110, operating the button of the control panel 120, or opening the cover of the image reading unit 150.

The image forming apparatus 100 waits (NO in ACT 501) until receiving the start operation. When it is determined that the start operation is received (YES in ACT 501), the image forming apparatus 100 displays a confirmation screen as to whether or not the storage medium 304 is connected and determines whether or not the storage medium 304 is connected (ACT 502). When it is determined that the storage medium 304 is connected (YES in ACT 502), the image forming apparatus 100 reads the operation information stored in the connected storage medium 304 (ACT 503).

Then, image forming apparatus 100 analyzes the operation information (ACT 504). Next, the image forming apparatus 100 displays a screen corresponding to a simple operation procedure on the display 110 (ACT 505). Then, the image forming apparatus 100 receives "OK" or "NG" from the user for a confirmation item displayed on the screen corresponding to the simple operation procedure (ACT 506). When "NG" is received from the user in ACT 506 (NO in ACT 506), the image forming apparatus 100 receives correction using the operation unit 201 such as the display 110 and the control panel 120 (ACT 507), and the process proceeds to ACT 508. When "NG" is received from the user (NO in ACT 506), the operation information input process may be ended without performing processing of ACT 507, or the process may proceed to ACT 509.

In ACT 507, when "OK" is received from the user (YES in ACT 506), the image forming apparatus 100 determines whether or not a next confirmation item is present (ACT 508). When it is determined that the next confirmation item is present (YES in ACT 508), the image forming apparatus 100 returns to ACT 505 and displays a next screen corresponding to the simple operation procedure. When it is determined that no next confirmation item is present (NO in ACT 508), the process proceeds to ACT 510.

When it is determined, in ACT 502, that the storage medium 304 is not connected (NO in ACT 502), the image forming apparatus 100 displays a screen corresponding to a normal operation procedure and receives a normal operation (ACT 509). Then, the image forming apparatus 100 determines whether or not the operation is printing start such as receiving an operation of a printing start button (ACT 510). The image forming apparatus 100 waits until the printing operation is started (NO in ACT 510). When it is determined that the printing operation is started (YES in ACT 510), the image forming apparatus 100 executes various kinds of processing such as image reading processing and image forming processing (ACT 511), and ends a series of processing.

Figure 6A:
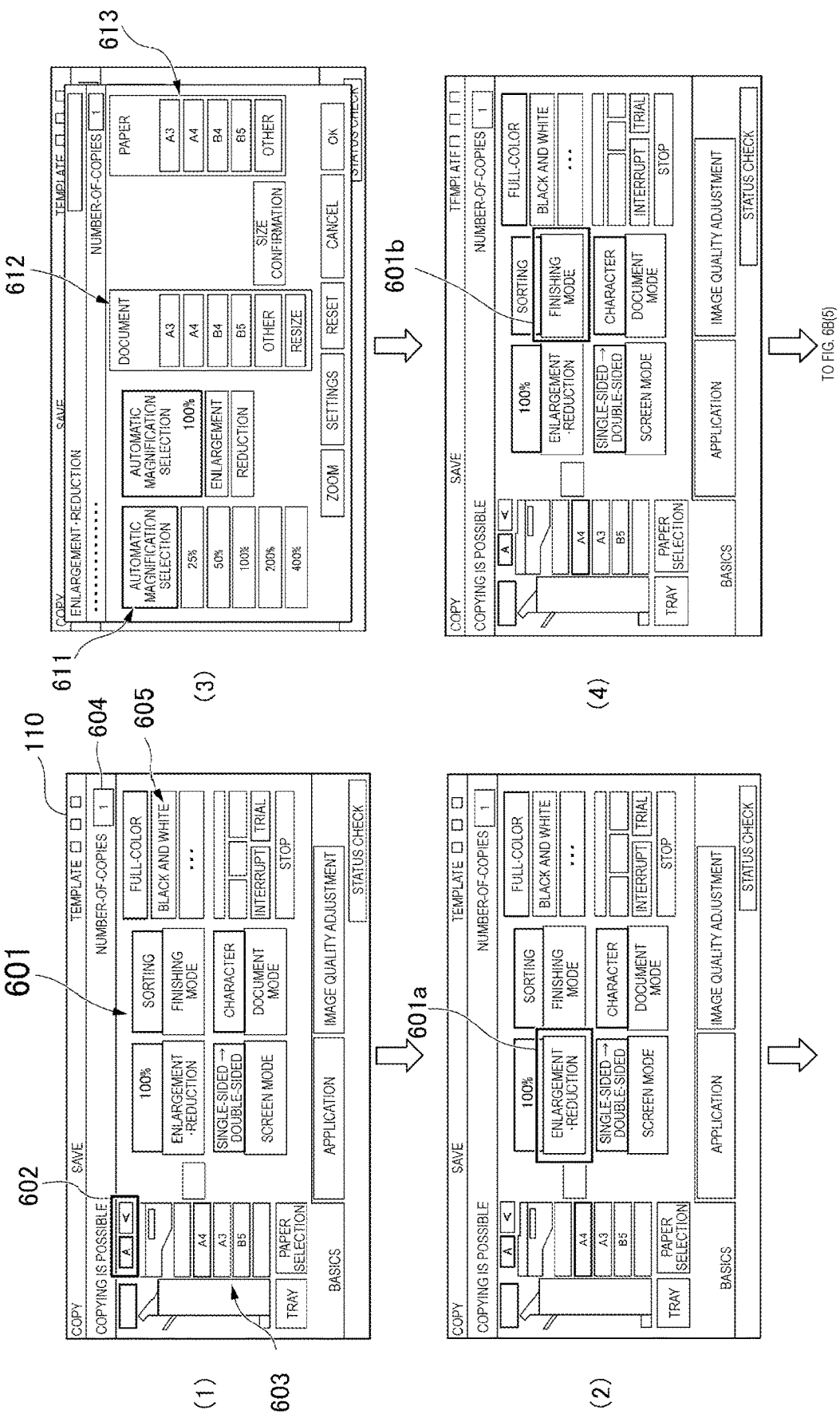
FIG. 6A illustrates an example of screens according to a normal operation procedure, which are displayed on a display of the image forming apparatus.
Figure 6B:
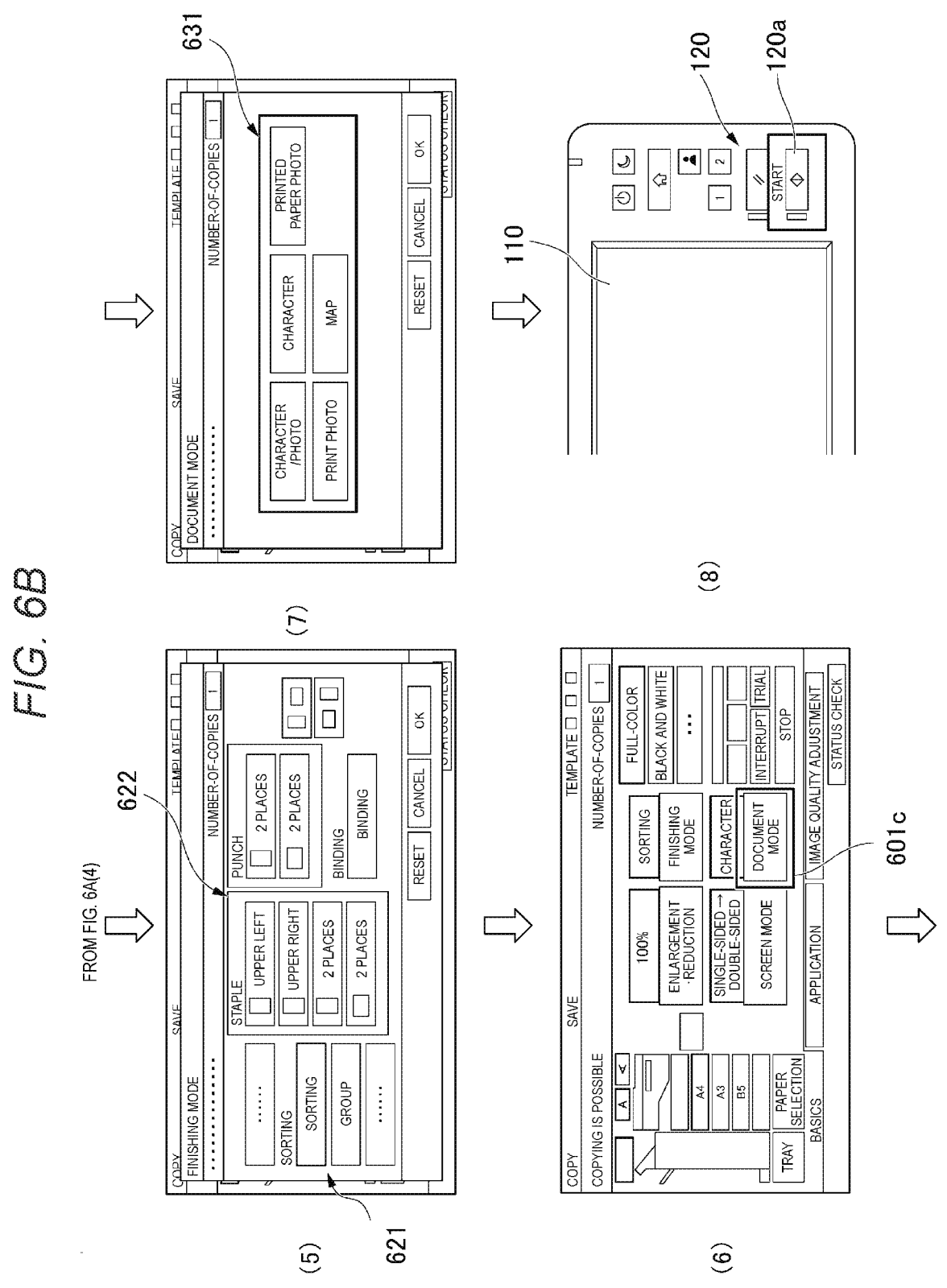

Next, an example of a transition of the screen corresponding to the normal operation procedure displayed on the display 110 of the image forming apparatus 100 will be described with reference to FIGS. 6A and 6B. FIGS. 6A and 6B illustrate an example of screens according to the normal operation procedure, displayed on the display 110 of the image forming apparatus 100. As illustrated in portion (1) of FIG. 6A, various buttons including buttons 601 to 605 are displayed on the display 110 of the image forming apparatus 100. The buttons are examples of selectable objects.

The mode switching buttons 601 are buttons for switching various modes. The various mode buttons are buttons for switching between enlargement and reduction mode, finishing mode, double-sided mode, and document mode. When the user operates any one of the various mode buttons, the transition is made to a screen of the mode indicated by the operated button.

The vertical and horizontal switching buttons 602 are buttons for receiving selection between a vertical direction and a horizontal direction when reading a sheet of a document. In the example, "horizontal" is selected. When a button indicating "vertical" is pressed or otherwise selected or operated from among the vertical and horizontal switching buttons 602, the "vertical" is selected.

The sheet selection buttons 603 are buttons for receiving selection of a size of a sheet to be copied. In the figure, a sheet of A4 is selected. When, for example, a button indicating "A3" is pressed among the sheet selection buttons 603, a sheet of A3 is selected.

The number-of-copies selection button 604 is a button for receiving selection of the number of copies of sheets to be copied. In the figure, "1" is selected. When the number-of-copies selection button 604 is depressed, for example, a "+" button or a "−" button is displayed. When the "+" button is depressed, the number of copies increases, and when the "−" button is depressed, the number of copies decreases.

The color and black and white selection buttons 605 receive selection of black and white printing or color printing. In the figure, color printing is selected. When the user operates a button indicating black and white among the color and black and white selection buttons 605, black and white printing is selected. The color and black and white selection button 605 includes a button for setting an image density. The image density can be changed by operating the button.

The portion (2) of FIG. 6A illustrates a screen in which the user operated an enlargement and reduction mode button 601a among the mode switching buttons 601. When the enlargement and reduction mode button 601a is operated, a magnification selection button 611, a document selection button 612, a paper selection button 613, and the like are displayed as illustrated in portion (3) of FIG. 6A. The magnification selection button 611 receives selection of magnification (enlargement and reduction) of an image to be printed on a sheet to be copied. The document selection button 612 receives selection of a size of a document sheet. The paper selection button 613 receives selection of the size of the sheet to be copied.

The portion (4) of FIG. 6A illustrates a screen in which the user operated a finishing mode button 601b among the mode switching buttons 601. When the finishing mode button 601b is operated, an output format selection button 621, a finishing format selection button 622, and the like are displayed, as illustrated in portion (5) of FIG. 6B. The output format selection button 621 receives selection of an output format of a sheet to be output to a tray. The finishing format selection button 622 receives selection of the presence and absence and position of a staple and selection of the presence and absence and position of a punch hole.

The portion (6) of FIG. 6B illustrates a screen in which the user operated a document mode button 601c among the mode switching buttons 601. When the document mode button 601c is operated, a document format selection button 631 is displayed as illustrated in portion (7) of FIG. 6B. The document format selection button 631 receives selection of a document format (photograph, character, map, and the like). Then, as illustrated in portion (8) of FIG. 6B, when the user operates a start button 120a of the control panel 120, copying is started.

As illustrated in FIGS. 6A and 6B, on the screen corresponding to the normal operation procedure, since various changes are hierarchically received so that the entire screen is changed as compared with the previous screen, it may be difficult to understand which hierarchy is being displayed. That is, it may be difficult for the user to grasp, and the operation may be troublesome for the user. It may be difficult for a user unfamiliar to finding a desired button when performing the special setting and to intuitively understand the desired button.

Next, an example of transition of screens displayed on the display 700 of the personal computer 300 will be described with reference to FIGS. 7A-7I. FIGS. 7A-7I illustrate an example of a setting input screen displayed on the display 700 of the personal computer 300. As illustrated in FIG. 7A, on the display 700 of the personal computer 300, a selection screen 710 for selecting a model of the multifunction peripheral is displayed. The selection screen 710 includes model selection buttons 711 to 713 for receiving selection of each model.

The "standard" of the model selection button 713 is a button for receiving a setting corresponding to an approximate model without specifying the model. On the other hand, when a model indicated by the model selection buttons 711 and 712 is selected, it is possible to set a function peculiar to the selected model. In FIG. 7A, for example, when the user selects (clicks) the model selection button 712, the transition is made to a screen illustrated in FIG. 7B.

FIG. 7B illustrates a selection screen 720 for receiving selection of a job after the model is selected. As illustrated in FIG. 7B, the selection screen 720 includes various buttons 721 to 723 for receiving the selection of the job. The scan setting button 721 is a button for receiving input of various settings when reading an image and acquiring or storing the read image data. The various settings mentioned here include, for example, resolution, image processing, and document type.

The copy setting button 722 is a button for receiving input of various settings when copying. The print setting button 723 is a button for transitioning to a screen that receives input of various settings when printing. When the copy setting button 722 is selected, the screen transitions to a screen illustrated in FIG. 7C.

FIG. 7C illustrates a selection screen 730 that receives input of various settings when copying. As illustrated in FIG. 7C, the selection screen 730 includes an image editing button 731, a finish editing button 732, a paper editing button 733, a save button 734, and the like. The image editing button 731 includes a character insertion button 731a, an image processing button 731b, and a setting 2 button 731c. The character insertion button 731a is a button that receives adding characters to a sheet to be printed. The image processing button 731b is a button that receives changing a character color or background color. The setting 2 button 731c is a button for receiving a setting different from the setting displayed on the current screen.

The finish editing button 732 is a button for designating a paper size, a layout, and the like. The paper editing button 733 is a button for editing an image to be printed. The save button 734 is a button for receiving saving information about the operation procedure based on the setting contents displayed on the current screen in the storage medium 304.

In FIG. 7C, when the character insertion button 731a is selected, a transition is made to a screen illustrated in FIG. 7D. FIG. 7D illustrates a character insertion screen 740. On the character insertion screen 740, an input area 741 and a screen prompting the user to input a character in the input area 741 are displayed. The user inputs the character in the input area 741 using a keyboard or the like. The settings (size, color, font type, and the like) of input character can be changed using, for example, a function of changing a character setting of the personal computer 300. The character can be pasted at a position desired by the user by using a drag and drop function of a mouse.

Here, even if a character can be inserted from the display 110 of the image forming apparatus 100, the operation is cumbersome because the character input is mainly made by non-mouse and non-keyboard operations in the image forming apparatus 100, and if the user is unfamiliar thereto, it is not easy to add a desired character to a desired position. On the other hand, when the character insertion is performed in the personal computer 300, since mouse or keyboard operations are available, the operation for various settings is easy.

When a predetermined key (for example, an escape key) is operated on the character insertion screen 740, for example, even if a character is input in the input area 741, the screen may be returned to the previous screen (selection screen 730 of FIG. 7C).

FIG. 7E illustrates a completion screen 750 in which character insertion is completed. As illustrated, the completion screen 750 indicates that the insertion character 751 of "top secret" will be printed on the sheet to be copied at the position desired by the user.

FIG. 7F illustrates a selection screen 760 when the finish editing button 732 is selected. On the selection screen 760, selection items 761 from which various items can be selected is displayed. FIG. 7G illustrates a screen when a cursor is placed on the "paper size" displayed in the selection items 761. In FIG. 7G, a selection item 761a in the lower hierarchy according to the "paper size" is displayed. The selection item 761a is displayed so that various paper sizes can be selected.

When the cursor is placed on an area indicating a "direction" among the selection items 761 in FIG. 7G, selection items in the lower hierarchy according to the "direction" are displayed. In the screen illustrated in FIG. 7G, when the cursor is moved to an area other than the selection items 761 and the selection item 761a or when the area is clicked, the screen returns to the original screen (for example, the completion screen 750 in FIG. 7E).

In FIG. 7G, when "A5" is selected from the items displayed in the selection item 761a, the notation of the finish editing button 732 is changed to "A5 vertical" as illustrated in FIG. 7H.

FIG. 7H illustrates a selection screen 770 when the paper editing button 733 is selected. On the selection screen 770, selection items 771 from which various items can be selected is displayed. When the cursor is placed on any one of the selection items 771, selection items in the lower hierarchy according to the selection item is displayed. Also in the screen illustrated in FIG. 7H, when the cursor is moved to an area other than the selection items 771 or the area is clicked, the screen returns to the original screen (for example, the completion screen 750 in FIG. 7E).

FIG. 7I illustrates a confirmation screen 780 when various inputs are completed and the save button 734 is selected. On the confirmation screen 780, a screen that receives "Yes" or "No" from the user is displayed. If "Yes" is selected, information about the operation procedure based on the setting contents is stored in the storage medium 304. If "No" is selected, the screen returns to the screen before the save button 734 is selected.

When each of the buttons 731 to 733 is selected, it may be possible to receive duplicate setting contents for each button. Specifically, for example, when the finish editing button 732 of FIG. 7C is selected, the item of "paper size" is displayed, but even when the paper editing button 733 is selected or when the paper editing button 733 is selected and further an item in the lower hierarchy is selected, the item of "paper size" may be displayed.

As described above, on the input screen of the setting contents of the personal computer 300, only the items corresponding to the lower hierarchy of the selected item can be displayed. The screen can be returned to the original screen only by the user moving the cursor on an area other than a display area of the selected item. As such, the screen displayed on the personal computer 300 does not mean that the entire screen changes as compared to the previous screen, as when the mode switching button 601 illustrated in portion (3) of FIG. 6A, portion (5) of 6B, or portion (7) of 6B is selected. Therefore, inputting various setting contents using the personal computer 300 is easier than inputting on the display 110 of the image forming apparatus 100 because inputting using the personal computer 300 is easy to grasp which hierarchy of setting contents is displayed. Since it is easy for the user to intuitively understand, the user can easily input the setting contents even when the special setting is performed.

Next, an example of a screen corresponding to a simple operation procedure displayed on the display 110 of the image forming apparatus 100 when operation information is input from the storage medium 304 will be described with reference to FIGS. 8A-8C. FIGS. 8A-8C illustrate an example of screens according to the simple operation procedure, displayed on the image forming apparatus 100 when the operation information is input from the storage medium 304. FIG. 8A illustrates an operation screen 810 that is displayed first when copying is performed. On the operation screen 810, a storage medium input button 811 indicating an input from the storage medium 304 and a normal input button 812 indicating an input by a normal operation are displayed.

When the normal input button 812 is operated, as illustrated in FIGS. 6A and 6B, the setting contents are input from the screen corresponding to the normal operation procedure. On the other hand, when the storage medium input button 811 is operated and the storage medium 304 is connected to the image forming apparatus 100, the screen transitions to the screen illustrated in FIG. 8B. When the storage medium 304 is already connected to the image forming apparatus 100, the screen illustrated in FIG. 8B may be displayed without displaying the operation screen 810.

FIG. 8B illustrates a first confirmation screen 820 based on the operation information input from the storage medium 304. On the first confirmation screen 820, items 821 relating to image reading set in the personal computer 300 are displayed for confirmation. For example, when any item 821 is operated on the first confirmation screen 820, detailed contents may be displayed, and the operation information may thus be corrected. On the first confirmation screen 820, an OK button 822a and a NO button 822b are displayed. When the NO button 822b is operated, for example, reading of the image based on the operation information input from the storage medium 304 may be ended. In this case, for example, the transition may be made to a screen corresponding to the normal operation procedure illustrated in FIGS. 6A and 6B.

Here, the model (see FIG. 7A) of the image forming apparatus 100 designated by the personal computer 300 may be different from the actual model of the image forming apparatus 100 to which the storage medium 304 is eventually connected. In this case, the image forming apparatus 100, to which the storage medium 304 is connected, may not have the function set by the personal computer 300. In this case, the image forming apparatus 100 may display an available function similar to the function set by the personal computer on the item 821. In this case, the image forming apparatus 100 may also display that the similar function is indicated in the item 821. If the image forming apparatus 100 does not have the similar function, the image forming apparatus 100 may display that the function is not available or the image forming apparatus 109 is of a model is different from the model designated by the personal computer 300.

In FIG. 8B, when the user operates the OK button 822a, the image reading unit 150 starts reading the image. Then, the transition is made to the screen illustrated in FIG. 8C.

FIG. 8C illustrates a second confirmation screen 830 for confirming the image of the sheet to be copied. On the second confirmation screen 830, items 831, which are relating to printing and are set by the personal computer 300, are displayed for confirmation. For example, when any of the items 831 is operated on the second confirmation screen 830, detailed contents may be displayed and the operation information may thus be corrected. When the NO button 832b is operated on the second confirmation screen 830, for example, printing based on the operation information input from the storage medium 304 may be ended. In this case, for example, the transition may be made to the screen corresponding to the normal operation procedure illustrated in FIGS. 6A and 6B. When the YES button 832a is operated on the second confirmation screen 830, printing is started with the contents displayed on the second confirmation screen 830, and the printed sheet is output.

When printing ends, the image forming apparatus 100, in general, discards the operation information. However, in some examples, the image forming apparatus 100 may store the operation information and user's identification information in association with each other. In this case, the image forming apparatus 100 may receive the input of the user's identification information and read the operation information associated with the received user's identification information at the next printing. With this configuration, based on the operation information input once, various kinds of processing can be performed with the setting contents for each user from the next time onward.

As illustrated in FIGS. 8A-8C, the operation procedure based on the operation information is an operation procedure having a smaller number of input operation times than that in the normal operation procedure. Specifically, in order to input the setting contents illustrated in FIGS. 8A-8C in the normal operation procedure, the display 110 needs to be operated many times (for example, at least four times or more) (see FIGS. 6A and 6B), but in the operation procedure illustrated in FIGS. 8A-8C, for example, the operation (e.g., button selection) can be performed three times.

Figure 9:
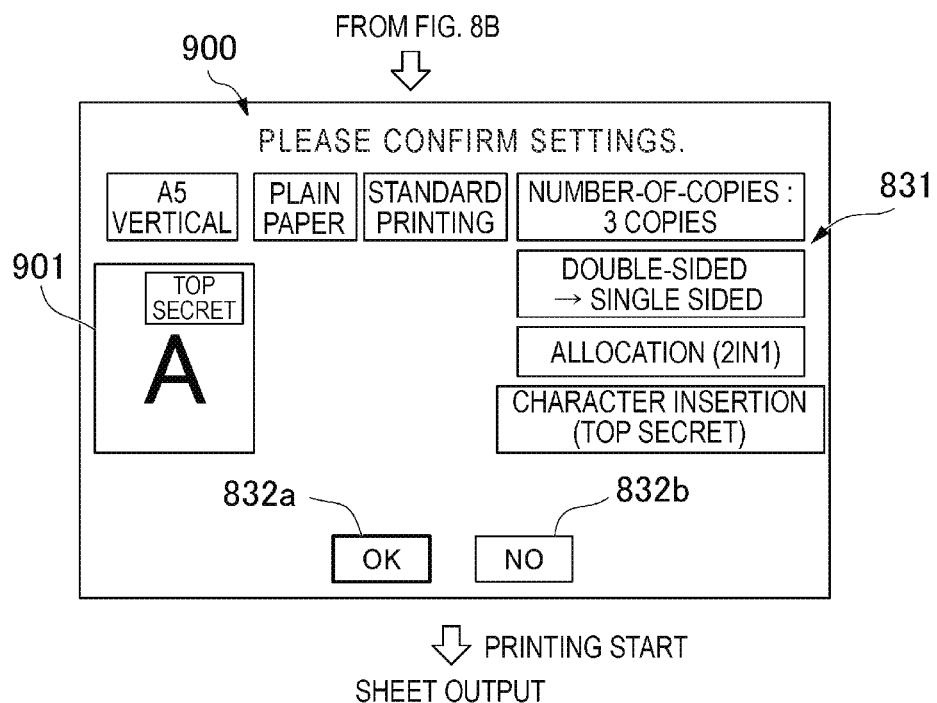
FIG. 9 illustrates a modification example of a second confirmation screen.

FIG. 9 illustrates a modification example of the second confirmation screen 830 illustrated in FIG. 8C. A second confirmation screen 900 illustrated in FIG. 9 is different from the screen illustrated in FIG. 8C in that an image 901 illustrating an image (print image) of the sheet to be copied is additionally displayed. On the second confirmation screen 900, the arrangement of items 831 relating to printing is also different from the screen illustrated in FIG. 8C, but the contents indicated by the items 831 are the same.

The image forming apparatus 100 generates and displays the image 901 based on the operation information input from the storage medium 304 in FIG. 8A and the read setting contents accepted by the user in FIG. 8B. In FIG. 9, when the image 901 is operated, the image 901 may be enlarged and a more detailed display may be performed. In this case, the display format of the items 831 may also be displayed in a display format that is visually easy to recognize.

By displaying the image 901 illustrated in FIG. 9, the user can visually confirm various settings of the sheet to be copied. Accordingly, according to the image forming apparatus 100 according to the modification example, it is possible to drastically reduce printing mistakes.

The image forming apparatus 100 according to the embodiment described above is configured to receive an operation in an operation procedure based on operation information when the operation information is input. With this configuration, printing involving complicated image processing can be performed without performing a complicated operation in the image forming apparatus 100. Accordingly, the setting contents can be input to the image forming apparatus 100 by a simple operation procedure. For that reason, it is possible to suppress the user's stress on the operation input to the image forming apparatus 100. Since the user can input the setting contents at a home or the like other than the store, the setting contents can be input without applying mental pressure due to occupying the image forming apparatus 100. Since it is possible to prevent one user from using the image forming apparatus 100 for a long time in the store, it is possible to prevent congestion of other customers and improve the utilization efficiency of the image forming apparatus 100.

In the present embodiment, the image forming apparatus 100 is configured to input information about the operation procedure stored in the storage medium 304. With this configuration, the user can carry the storage medium 304 and visit the store, and simply perform printing by connecting the storage medium to the image forming apparatus 100. That is, it is possible to perform printing involving complicated image processing without performing a complicated operation in the image forming apparatus 100.

In the present embodiment, the operation procedure based on the operation information is an operation procedure having the smaller number of operation times than that in the normal operation procedure. Accordingly, the user can perform printing simply performing a confirmation operation (operating the OK button). That is, it is possible to perform printing involving complicated image processing without performing the complicated operation in the image forming apparatus 100.

In the present embodiment, the operation information is generally different depending on the particular model of the image forming apparatus 100. However, with this configuration, the image forming apparatus 100 can input operation information adjusted according to the model.

The functions of the image forming apparatus 100 and the personal computer 300 in the embodiment described above may be achieved by a computer. In this case, these functions may be achieved by recording the program for realizing the functions in a non-transitory computer-readable recording medium, loading the program from the recording medium into a computer system, and executing the program on the computer system. In this context, a "computer system" can include an operating system (OS) and other hardware such as a peripheral device. A "computer-readable recording medium" refers to a storage device, for example, a portable medium such as a flexible disk, a magneto-optical disk, a ROM, a CD-ROM, a storage device such as a hard disk built in a computer system, and the like. Furthermore, the "computer-readable recording medium" may be cloud-based and/or accessed via a communication line such as a telephone line or a network such as the Internet. The program described above may be a program for realizing a part of the functions described above, or may be a program that can realize the functions described above in combination with a program already recorded in the computer system.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a scanner;
    a display;
    an interface configured to receive setting information from an external medium for processing of an image read by the image reader; and
    a controller configured to:
        control the display to display a first setting screen for copy processing of the image when the setting information is not received from the external medium; and
        control the display to display a sequence of second setting screens for copy processing of the image when the setting information is received from the external medium, the sequence of second setting screens indicating that an operational setting corresponding to the setting information from the external medium is set, wherein the sequence of second setting screens for the copy processing includes a first confirmation screen of a scan setting followed by a second confirmation screen of a print setting.

2. The image processing apparatus according to claim 1, wherein,
    when the first setting screen is displayed, a user input operation is required to set an operational setting,
    when the first confirmation screen is displayed, a first user input to confirm the scan setting is required for scanning with the scan setting on the image processing apparatus, and
    when the second confirmation screen is displayed, a second user input to confirm the print setting is required for printing with the print setting on the image processing apparatus.

3. The image processing apparatus according to claim 1, wherein
    the first setting screen includes a first selectable object to set a first part of the operational setting and a second selectable object to set a second part of the operational setting, and
    the second setting screen indicates that the first and second parts of the operational setting are set.

4. The image processing apparatus according to claim 1, wherein the operational setting corresponding to the setting information from the external medium cannot be set on the first setting screen.

5. The image processing apparatus according to claim 1, wherein the controller is configured to:
    perform an operation to retrieve the setting information from the external medium when a user input to retrieve the setting information from the external medium is made, and
    control the display to display the first setting screen when a user input to not retrieve the setting information from the external medium is made.

6. The image processing apparatus according to claim 1, wherein the interface includes a connector connectable to the external medium.

7. The image processing apparatus according to claim 1, wherein
    the interface is configured to read a code symbol on the external medium, and
    the code symbol represents the setting information.

8. The image processing apparatus according to claim 1, wherein the interface includes a wireless communication interface configured to wirelessly receive the setting information from a storage included in the external medium.

9. The image processing apparatus according to claim 8, wherein the wireless communication interface is a wireless tag reader, and the external medium is a wireless tag.

10. The image processing apparatus according to claim 1, wherein the external medium is a storage included in a server, and the interface is configured to receive the setting information from the server over a network.

11. A method for controlling an image processing apparatus including a scanner, a display, and an interface, the method comprising:

controlling the display to display a first setting screen for copy processing an image read by the image reader when setting information for processing of the image is not received by the interface from an external medium; and controlling the display to display a sequence of second setting screens for copy processing the image when the setting information is received by the interface from the external medium, the sequence of second setting screens indicating that an operational setting corresponding to the setting information from the external medium is set, wherein the sequence of second setting screens for the copy processing includes a first confirmation screen of a scan setting followed by a second confirmation screen of a print setting.

12. The method according to claim 11, wherein when the first setting screen is displayed, a user input operation is required to set an operational setting on the image processing apparatus, when the first confirmation screen is displayed, a first user input to confirm the scan setting is required for scanning with the scan setting on the image processing apparatus, and when the second confirmation screen is displayed, a second user input to confirm the print setting is required for printing with the print setting on the image processing apparatus.

13. The method according to claim 11, wherein the first setting screen includes a first selectable object to set a first part of the operational setting and a second selectable object to set a second part of the operational setting, and the second setting screen indicates that the first and second parts of the operational setting are set.

14. The method according to claim 11, wherein the operational setting corresponding to the setting information from the external medium cannot be set on the first setting screen.

15. The method according to claim 11, wherein the interface includes a connector, and the setting information is received from the external medium via the connector.

16. An image processing system, comprising:

an information processing apparatus configured to generate setting information and store the setting information on a storage medium, and an image processing apparatus including:

a scanner;

a display;

an interface configured to receive the setting information from the storage medium, the setting information for processing of an image read by the image reader; and a controller configured to:

control the display to display a first setting screen for copy processing of the image when the setting information is not received from the storage medium; and control the display to display a sequence of second setting screens for copy processing of the image when the setting information is received from the storage medium, the sequence of second setting screens indicating that an operational setting corresponding to the setting information from the storage medium is set, wherein the sequence of second setting screens for the copy processing includes a first confirmation screen of a scan setting followed by a second confirmation screen of a print setting.

17. The image processing system according to claim 16, wherein when the first setting screen is displayed, a user input operation is required to set the operational setting on the image processing apparatus, when the first confirmation screen is displayed, a first user input to confirm the scan setting is required for scanning with the scan setting on the image processing apparatus, and when the second confirmation screen is displayed, a second user input to confirm the print setting is required for printing with the print setting on the image processing apparatus.

18. The image processing system according to claim 16, wherein the first setting screen includes a first selectable object to set a first part of the operational setting and a second selectable object to set a second part of the operational setting, and the second setting screen indicates that the first and second parts of the operational setting are set on the image processing apparatus.

19. The image processing system according to claim 16, wherein the operational setting corresponding to the setting information from the storage medium cannot be set on the first setting screen.

20. The image processing system according to claim 16, wherein the controller is configured to:

perform an operation to retrieve the setting information from the storage medium when a user input to retrieve the setting information from the removable storage medium is made, and control the display to display the first setting screen when a user input to not retrieve the setting information from the storage medium is made.

* * * * *